(12) United States Patent
Olsson (10) Patent No.: US 7,110,604 B2
(45) Date of Patent: Sep. 19, 2006

(54) PROCESSING OF DIGITAL IMAGES (75) Inventor: Andreas Olsson, Lund (SE)

(73) Assignee: Anoto AB, Lund (SE)

( * ) Notice: Subject to any disclaimer, the term of this patent is extended or adjusted under 35 U.S.C. 154(b) by 714 days.

(21) Appl. No.: 10/179,967

(22) Filed: Jun. 26, 2002

(65) Prior Publication Data

US 2003/0053699 A1    Mar. 20, 2003

Related U.S. Application Data

(60) Provisional application No. 60/302,360, filed on Jul. 3, 2001.

(30) Foreign Application Priority Data

Jun. 26, 2001    (SE)    .................................... 0102254

(51) Int. Cl.
*G06K 9/62* (2006.01)

(52) U.S. Cl. ...................... 382/224; 382/232; 348/353; 358/465; 358/539

(58) Field of Classification Search ................ 382/165, 382/232, 199, 195, 190, 181, 238, 224; 348/618, 348/353, 699, 609; 358/400, 465, 518, 520, 358/448, 443, 534, 539; 706/4, 2, 10, 12; 378/57; 375/240.12, 240.16
See application file for complete search history.

(56) References Cited

U.S. PATENT DOCUMENTS

| | | | | |
|---|---|---|---|---|
| 4,593,325 A | * | 6/1986 | Kannapell et al. | 358/3.22 |
| 4,758,886 A | * | 7/1988 | Rylander | 358/534 |
| 5,051,736 A | | 9/1991 | Bennett et al. | 345/180 |
| 5,221,833 A | | 6/1993 | Hecht | 235/494 |
| 5,287,209 A | * | 2/1994 | Hiratsuka et al. | 358/1.9 |
| 5,477,012 A | | 12/1995 | Sekendur | 345/179 |
| 5,621,819 A | * | 4/1997 | Hozumi | 382/232 |
| 5,629,780 A | | 5/1997 | Watson | 382/250 |
| 5,764,611 A | | 6/1998 | Watanabe | 386/113 |
| 5,872,864 A | * | 2/1999 | Imade et al. | 382/176 |
| 5,963,676 A | | 10/1999 | Wu et al. | 382/274 |
| 6,167,158 A | * | 12/2000 | Boon | 382/238 |
| 6,275,532 B1 | * | 8/2001 | Hibi et al. | 375/240.17 |

FOREIGN PATENT DOCUMENTS

FR        2786011       11/1998
WO    WO 00/73983 A1    12/2000

(Continued)

OTHER PUBLICATIONS

SE 0103845-4, Sweden.
J. Kittler et al. ; "Threshold Selection Based on a Simple Image Statistic,"; SERC Rutherford Appleton Laboratory, Chilton, Didcot, Oxon, OX11 0QX United Kingdom; Dec. 1984, pp. 125-147.

(Continued)

*Primary Examiner*—Sheela Chawan
(74) *Attorney, Agent, or Firm*—Birch, Stewart, Kolasch & Birch, LLP (57) ABSTRACT

Methods and apparatuses for identifying objects in a digital image include a thresholding unit and a threshold calculation unit. The thresholding unit is designed to receive the digital image and compare the luminance values of the digital image with threshold values of a threshold matrix in order to create a binary image on the basis of the comparison. The threshold calculation unit is designed to estimate, on the basis of a first and second division of a reference image which corresponds to the digital image into first and second subareas, a background luminance value for each first subarea and an object luminance value for each second subarea. The apparatuses and the methods permit quick and memory-efficient identification of the individual objects, even if the digital image contains variation in the luminance and/or sharpness.

41 Claims, 5 Drawing Sheets

FOREIGN PATENT DOCUMENTS

| WO | WO 01/16691 A1 | 3/2001 |
| WO | WO 01/26032 A1 | 4/2001 |
| WO | WO 01/26033 A1 | 4/2001 |

OTHER PUBLICATIONS

V. Metzler, et al. ; "Morphological Multiscale Shape Analysis of Light Micrographs,"; IS&T/SPIE's 12th Annual symposium on Electronic Imaging 2000; San Jose, CA, Jan. 23-28, 2000; Retrieved from the Internet: http://www.isip.mu-luebeck.de/~metzler/papers/spieei2000b.html.

R. Fisher, et al. ; "Adaptive Thresholding"; Retrieved on Mar. 22, 2002, from the Internet: http://www.dai.ed.ac.uk/HIPR2/adpthrsh.htm.

R. Klette et al. ; "Handbook of Image Processing Operators,"; Wiley, Apr. 1996 pp. 373.

A. Savakis, et al. ; "Adaptive DocumentImage Thresholding Using Foreground and Background Clustering,"; Proceedings of International Conf. on Image Processing ICIP '98; Retrieved from the Internet: http://www.rit.edu/~axseec/papers/icip98adt.pdf.

* cited by examiner

PROCESSING OF DIGITAL IMAGES

This application claims priority on provisional Application No. 60/302,360 filed on Jul. 3, 2001, the entire contents of which are hereby incorporated by reference.

FIELD OF THE INVENTION

The present invention relates in general to processing of digital images, in particular thresholding or binarization thereof. The invention is particularly, but not exclusively, aimed at preliminary image processing prior to calculation of position information on the basis of the shape and/or location of an object in a digital image.

BACKGROUND ART

In digital image processing, it is sometimes desirable to separate some form of structure from a background in a digital image. This can be achieved by so-called thresholding or binarization, in which the luminance values of the pixels of the digital image are compared to a threshold value. More particularly, luminance values above the threshold value are set to 1, while luminance values below the threshold value are set to 0, or vice versa. With a well-selected threshold value, the thresholding results in a binary image with defined, real structures.

In many cases, a sequence of images is processed in a number of steps. One of the introductory steps can be the above-mentioned thresholding, which aims on the one hand to locate relevant structures and, on the other, to reduce the amount of data that is processed in subsequent steps. Of course, it is desirable for the thresholding to be carried out with high precision, as errors will otherwise propagate in the subsequent processing steps.

It its simplest form, the thresholding means that the luminance value of each pixel in a current image is compared with a global threshold value. Such so-called global thresholding requires, however, extensive control of the image recording so as to avoid luminance variations and noise. In practical applications there are often variations within each image, for example with regard to the background luminance, signal-to-noise ratio and sharpness. With global thresholding such variations can lead to structures being missed or to fictitious structures being identified, particularly at the periphery of the images.

In order to solve these problems, so-called local thresholding is used, in which a threshold value is calculated for each pixel in an image on the basis of the luminance values of the surrounding pixels. This is, however, a time-consuming operation that, in addition, requires intermediate storage of the digital image.

An example where the above considerations arise is in calculating a position based on images of a pattern on a base. The pattern contains individual symbols, the shape and/or relative location of which code said position. The images can, for example, be recorded optically by a sensor in a hand-held apparatus, for example in the form of a pen. Such a pen for position determination is described, for example, in U.S. Pat. No. 5,051,736, U.S. Pat. No. 5,477,012 and WO 00/73983 and can be used to record handwritten information digitally.

The above-mentioned images can be processed in a data processing unit, such as a suitably programmed microprocessor, an ASIC, an FPGA, etc, which receives a sequence of digital grayscale images, converts these to binary for identification of the above-mentioned symbols, and calculates a position on the basis of each binarized image. During the binarization, a threshold matrix is used that contains a threshold value for each pixel in the grayscale image. The recording of handwritten information should be carried out at high temporal resolution, typically approximately 50–100 images per second, for which reason it is difficult to combine the requirements for high precision in the thresholding with the require-ments for rapid processing and small memory requirement, even in a specially-adapted data processing unit.

In the article "Threshold Selection Based on a Simple Image Statistic", published in 1985 in the periodical *Computer Vision, Graphics and Image Processing*, No. 30, pp 125–147, examples are given of various local thresholding methods. One such method is based on the fact that an adequate threshold value can be calculated based on a derivative value for each pixel in the original grayscale image. More particularly, a derivative matrix is calculated by convolution of the grayscale image with a suitable derivative mask, whereupon the pixel values of the derivative matrix are multiplied by the pixel values of the grayscale image to create a product matrix. Thereafter the derivative matrix and the product matrix are divided into subareas, within which a respective sum of the pixel values is calculated. Finally, local threshold values are obtained for the various subareas from the quotient between the subarea sums for the product matrix and the derivative matrix. The method is, however, time-consuming, among other things as a result of the calculation of the derivative matrix by convolution and the calculation of the threshold matrix by division. The method is also undesirably memory-intensive, as it requires the intermediate storage of the grayscale image, the derivative matrix and the product matrix.

U.S. Pat. No. 5,764,611 describes a thresholding method to be applied to grayscale images containing a pattern of dark dots against a bright background. In this method, the grayscale image is divided into subareas, within which the pixel values are summed to create a sum matrix. A low-pass filter is then applied to this sum matrix to create a background matrix, which after multiplication by a suitable fraction value is considered to form a matrix of local threshold values. In addition to a time-consuming low-pass filtering, this thresholding method is hampered by being sensitive to lack of sharpness in the grayscale image. Such lack of sharpness must be eliminated by extensive pre-processing of the grayscale image. This is achieved by high-pass filtering of the incoming grayscale image, whereupon the resulting luminance values are summed within the above-mentioned subareas to create a contrast matrix. The contrast matrix is then used to produce coefficients for a subarea-specific contrast function, which is finally allowed to operate on the grayscale image in order to eliminate the lack of sharpness in the same. This pre-processing comprises several time-consuming operations and is, in addition, memory-intensive in that it requires the intermediate storage of both the grayscale image and the result of the high-pass filtering.

Prior-art technique also includes U.S. Pat. No. 4,593,325, which describes a method for adaptive thresholding of a grayscale image prior to binary duplication of the same.

SUMMARY OF THE INVENTION

An object of the present invention is thus to demonstrate a technique which permits the identification of individual objects in a digital image in a quick and memory-efficient way.

A further object is to demonstrate a technique that is relatively unaffected by variations in luminance and/or sharpness within an image.

These and other objects that will be apparent from the following description, are achieved completely or partially by means of a method according to claim 1, a device according to claim 22, a computer program product according to claim 39, a hardware circuit according to claim 40 and a hand-held apparatus for position determination according to claim 41. Preferred embodiments are defined in the dependent claims.

According to the invention, a reference image is used which is representative of the digital image which is to be processed, for the calculation of the threshold matrix. This reference image is given two predetermined, overlapping divisions, into first and second subareas. For each first subarea, a background luminance value is estimated, and for each second subarea, an object luminance value is estimated. Based on these estimated values, a threshold value is calculated for each overlapping first and second subarea. The threshold values form a threshold matrix which is used for binarization of the digital image.

In one way of looking at the matter, the invention enables rapid extraction of a low resolution background image and a low resolution object image from the reference image, after which the threshold matrix is created by threshold values being determined, according to some criterion, to be between associated values in the background and object images. The method according to the invention is a direct method which can be carried out quickly and with relatively low demands as to available memory capacity, since the threshold values can be calculated directly, subarea by subarea, based on the estimated background and object luminance values. The method can be carried out without any calculation-intensive operations, such as convolutions and divisions, even if the method, when necessary, can be supplemented with such an operation, for instance for filtering.

By means of a method according to the invention, individual objects can be identified in a digital image also with variations in luminance and/or sharpness within the same. The estimated background luminance values represent the variation in background luminance over the reference image, or at least a relevant portion thereof, which means that the threshold values can be determined in adequate relation to the background. The estimated object luminance values represent, in combination with the estimated background luminance values, the variation in contrast over the reference image or said portion, which means the threshold values can also be determined in adequate relation to the sharpness.

The division into first and second subareas makes it possible to easily adjust the method to achieve the desired calculation speed, robustness or precision, by selecting a suitable size of the first and second subareas. However, it should be pointed out that the division of the reference image, or a portion thereof, into subareas does not have to be a physical division. The subareas are as a rule intended and used for extraction of data from the reference image.

The first and second subareas conveniently extend over one and the same continuous portion of the reference image, and in particular so that each second subarea at least partly comprises a first subarea. This guarantees that a threshold value can be calculated for each subarea.

According to one embodiment, the first subareas are mutually exclusive and the second subareas are mutually exclusive. Such first and second subareas do not overlap, and are suitably arranged side by side within the relevant portion of the reference image. This minimizes the number of subareas of a given size which is necessary within a given portion of the reference image, which may be favorable for both calculation speed and memory capacity. In its simplest form, the first and second subareas may be identical, as regards size as well as relative position, i.e. the first and second subareas coincide.

According to an alternative embodiment, the first subareas partly overlap each other, and/or the second subareas partly overlap each other. Such an embodiment makes it possible to calculate the threshold matrix with greater accuracy and higher resolution. Moreover, the appearance of artefacts in the joint between subareas is minimized.

In the above embodiments, the size of the first and second subareas may be adjusted to optimal estimation of the background luminance values and object luminance values respectively, as will be discussed in more detail below.

During the method according to the invention, threshold values are generated in a threshold matrix. The term threshold matrix is to be interpreted figuratively to relate to an assembly of threshold values which are related to one part each of the reference image. Such a threshold matrix can be stored in a memory unit as a matrix, a plurality of vectors, or an assembly of individual threshold values. Alternatively, the calculated threshold values may be written one upon the other in one and same memory space in the memory unit, or be given as a sequence of values which is directly used for binarization of the digital image.

The above-mentioned reference image may be any image which is representative of the digital image which is to be binarized. When the digital image is included in a sequence of digital images, the reference image may consist of an image in this sequence of digital images.

According to one embodiment, the reference image consists of the digital image which is to be binarized. In this case the digital image thus is received, after which the background and object luminance values are estimated for the subareas and the threshold matrix is calculated. Then the threshold matrix is used for binarization of the digital image. Such an embodiment, with intermediate storage of the digital image, is robust and allows accurate binarization.

According to an alternative embodiment, the threshold matrix is calculated intermittently on the basis of the luminance values of a current image in the sequence of digital images, which threshold matrix can then be applied for the binarization of one or more subsequent images in the sequence of digital images. In this way, the calculation of the threshold matrix can be carried out in parallel with the actual thresholding, whereby more images can be processed per unit of time. In addition, the need for intermediate storage of the digital images is avoided, as these can be processed by direct comparison with an already-calculated threshold matrix. This is due to the fact that the algorithms according to the invention are sufficiently robust to permit calculation of the threshold values from a reference image which is similar but not identical to the image to which the thresholding is to be applied.

The method according to the invention can be based on a simple and calculation-efficient estimate of the background and object luminance values for each subarea.

According to an alternative, the background luminance value is estimated on the basis of first order statistics of the luminance values of the pixels within the first subarea. First order statistics, for example comprising the least value, the greatest value, the median value, the mean value and the sum of the pixels' luminance values within a subarea, can be extracted from a grayscale image in a calculation-efficient way.

Similarly, the object luminance value can be estimated on the basis of first order statistics of the luminance values of the pixels within the second subarea.

According to one embodiment, which is based on grayscale images with dark objects against a bright background, the background luminance value is estimated on the basis of the greatest luminance value of the pixels within the first subarea. Such a luminance value can be extracted from a grayscale image quickly and in a calculation-efficient way. According to one alternative, the background luminance value is estimated on the basis of the mean value of the luminance values of the pixels within the first subarea. According to another alternative, the background luminance value is estimated on the basis of a percentile value, for example in the range 80–95, of the luminance values within the first subarea.

In a corresponding way, the object luminance value can be estimated on the basis of the least luminance value of the pixels within the second subarea.

According to the invention, the subareas can be designed so that each of the second subareas comprises a whole number of the first subareas, whereby the threshold matrix is minimized since this only needs to contain one threshold value for each of the first subareas.

According to one embodiment, the second subareas are designed in such a way that they each contain at least a part of at least one of the objects that are to be identified. Accordingly, each second subarea contains with certainty at least one value of the luminance within an object. All threshold values in the resultant threshold matrix will thereby be related both to the objects and to the background against which the objects appear, and this is achieved without a separate selection for the elimination of threshold values belonging to subareas that do not contain any part of an object.

It is preferable that the second subareas are designed in such a way that they each contain at least one object in its entirety, which guarantees that each second subarea contains the object's extreme value in luminance. This simplifies the calculation of an adequate threshold value.

The image is preferably divided into first subareas that are larger than the objects that are to be identified, whereby each first subarea contains with certainty at least one value of the background luminance between the objects, in relation to which the threshold value can be set.

In one application, the objects are positioned relative to an invisible raster or grid of known dimensions. This application can serve for the calculation of positions described by way of introduction, for digital recording of handwritten information. As mentioned, a position is coded by the shape and/or location of one or more individual objects in an image. In addition to the references given above, the position-coding pattern can be mentioned that is described in Applicant's patent publications WO 01/16691, WO 01/26032 and WO 01/26033, which are herewith incorporated by reference. This position-coding pattern is constructed of marks, for example dots, which are located at a fixed distance from raster dots belonging to an invisible raster. The value of each mark is provided by its position relative to the associated raster dot. A plurality of such marks together code a position that is given by two or more coordinates. All of the position-coding patterns stated above contain objects that are a known distance apart, which is given by the distance between the raster dots and the distance between the objects and the raster dots. The subareas can thereby be designed in relation to the known dimensions of the raster, for example in such a way that each subarea contains at least a part of at least one object or at least one object in its entirety. If the current image is recorded with a certain inclination of the sensor relative to the position-coding pattern, the distance between the objects will vary across the image, for which reason this type of perspective distortion must be taken into account when dimensioning the subareas.

In this connection, WO 00/73983 should also be mentioned, which describes a position-coding pattern containing marks of two different sizes, where each mark is centered at a respective raster dot of an invisible raster. In addition, U.S. Pat. No. 5,221,833 describes a coding pattern containing marks in the form of lines with different angles of rotation around their dot of symmetry, where each such mark is centered at a respective raster dot of an invisible raster. Also in these cases, it is possible to size the subareas taking into account the dimensions of the raster, so that each subarea contains with certainty at least a part of an object or an object in its entirety.

According to the invention, there can also be a classification of the subareas into at least a first category with a high signal-to-noise ratio and a second category with a low signal-to-noise ratio. The classification is used for calculating the threshold value for each subarea, by setting the threshold value at a larger relative distance or contrast depth from the background luminance value in subareas belonging to the second category than in subareas belonging to the first category. As a result, the danger is reduced of the threshold value being at the level of noise in the proximity of the object. Such a threshold value could generate a number of fictitious structures around the actual object. In one exemplary embodiment, the threshold value for subareas belonging to the first and second categories is set at a relative distance to the background luminance value of approximately 40–60% and approximately 60–80% of the contrast, respectively.

In addition, the subareas can be further classified into a third category with a high signal-to-noise ratio and a low contrast. In many cases, the subareas belonging to the third category are overexposed, for which reason the luminance depth of the object is given by only one or a few pixels. In order to increase the probability of objects in these subareas being identified as a plurality of connected pixels, it has been found suitable to set the threshold value at a smaller relative distance or contrast depth from the background luminance value in subareas belonging to the third category in subareas belonging to the first category. In an exemplary embodiment, the threshold value for a subarea belonging to the third category is set at a relative distance to the background luminance value of approximately 30–50% of the contrast.

The classification of the subareas with regard to their signal-to-noise ratio can be carried out based on a statistical variation measure, for example normalized standard deviation. For images comprising dark objects against a bright background, however, the signal-to-noise ratio is related to the background luminance value. Therefore in a calculation-efficient embodiment, the classification can be carried out by comparison of the greatest luminance value within the subarea and a limit level. This limit level can, for example, correspond to the mean value of the greatest luminance values of all the subareas. Alternatively, the limit level can, for example, consist of a predetermined fixed value.

According to one embodiment, a characteristic level is estimated for the luminance values within each subarea, where the relative distance between the threshold value and the background luminance value is set depending upon this characteristic level, which suitably is indicative of the signal-to-noise ratio in the subarea. The characteristic level can also indicate any overexposure of a subarea, with the ensuing danger of reduced contrast. Thus the threshold value can be adapted to the conditions in the subarea, as indicated by the characteristic level. For example, the characteristic level can be produced on the basis of the mean value, the median value or the sum of the luminance values of the pixels within a subarea. In certain cases, the least or the greatest luminance value within a subarea can represent the characteristic level of the subarea. For grayscale images of dark objects against a bright background, it is preferable for the relative distance between the threshold value and the background luminance value to be a monotonically decreasing function of the characteristic level.

The calculated threshold value can be more or less representative of the pixels within the current subarea. In particular, the threshold value can be less representative at the edges of the subarea. As the threshold value changes in steps at these edges, unwanted artefacts can arise in the thresholding of the digital image. In order to minimize this potential problem, a subsequent smoothing step is preferably implemented, in which each calculated threshold value is updated on the basis of adjacent calculated threshold values in the threshold matrix.

In one embodiment, the threshold matrix is given further threshold values in the smoothing step, by interpolation of adjacent calculated threshold values in the threshold matrix. In the interpolation, the threshold matrix is thus given further threshold values which are used for the thresholding of an associated part of the grayscale image. The interpolation can be of any kind, for example linear, and can be implemented in one or more steps.

According to one embodiment, the smoothing step comprises, alternatively or additionally, a low-pass filtering of the threshold matrix.

The invention also relates to a device, a computer program product and a hardware circuit for the identification of individual objects in a digital image, and a hand-held apparatus for position determination.

The advantages of the device, the computer program product, the hardware circuit and the hand-held apparatus will be apparent from the above description. Features that are described in connection with the method for identifying individual objects are of course also applicable to the device, the computer program product, the hardware circuit and the hand-held apparatus.

BRIEF DESCRIPTION OF THE DRAWINGS

For the purpose of exemplification, the invention will be described below with reference to the accompanying drawings, which illustrate a currently preferred embodiment and in which FIG. 3 shows schematically the construction of a data processor in the pen in FIG. 1B, FIGS. 4A–4B illustrate schematically the division of an image into subareas for the calculation of a threshold matrix according to a first and a second embodiment, respectively.

DESCRIPTION OF PREFERRED EMBODIMENTS

The description below concerns position determination based on images of a position-coding pattern. The position-coding pattern can be of any type, for example any one of the patterns mentioned by way of introduction. In the following, however, the invention is exemplified in connection with the pattern that is described in Applicant's Patent Publications WO 01/16691, WO 01/26032 and WO 01/26033. This pattern will be described briefly below with reference to FIG. 1A.

Figure 1A:
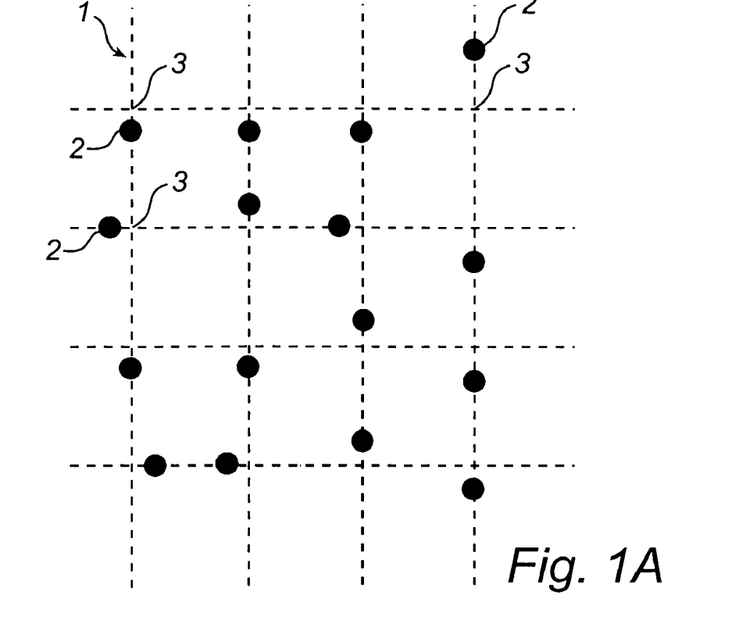
FIG. 1A shows schematically an example of 4×4 marks that are used to code a position.

The position-coding pattern comprises a virtual raster or grid 1, which is thus neither visible to the human eye nor can be detected directly by a device which is to determine positions on the surface, and a plurality of marks 2, each of which, depending upon its position, represents one of four values "1" to "4". The value of the mark 2 depends upon where it is placed in relation to its nominal position 3. The nominal position 3, which can also be called a raster dot, is represented by the intersection of the raster lines.

In one embodiment, the distance between the raster lines is 300 µm and the angle between the raster lines is 90 degrees. Other raster intervals are possible, for example 254 µm to suit printers and scanners which often have a resolution which is a multiple of 100 dpi, which corresponds to a distance between dots of 25.4 mm/100, that is 254 µm.

In the example in FIG. 1A, there are four possible locations, one on each of the raster lines extending from the nominal position 3. The displacement from the nominal position 3 is the same size for all values. Each mark 2 is, at its center of gravity, displaced relative to its nominal position 3, that is no mark is located at the nominal position. In addition, there is only one mark 2 per nominal position 3.

In one embodiment, the marks 2 are displaced relative to the nominal positions 3 by 50 µm along the raster lines. The displacement is preferably ⅙ of the raster interval, as it is then relatively easy to determine to which nominal position a particular mark belongs. The displacement should be at least approximately ⅛ of the raster interval, otherwise it becomes difficult to determine a displacement, that is the requirements for resolution become great. On the other hand, the displacement should be less than approximately ¼ of the raster interval, in order for it to be possible to determine to which nominal position a mark belongs.

Each mark 2 consists of a more or less circular dot with a radius which is approximately the same size as the displacement or somewhat less. The radius can be 25% to 120% of the displacement. If the radius is much larger than the displacement, it can be difficult to determine the raster lines. If the radius is too small, a greater resolution is required to record the marks. The marks do not, however, need to be circular or round, but any suitable shape can be used, such as square, triangular, elliptical, open or closed, etc.

The pattern described above can be designed to code a very large number of absolute positions. For example, the pattern can be such that 6×6 adjacent marks together code a position, in the form of an x-coordinate and a y-coordinate. If a subset of the pattern is applied to a product, an electronic representation can be obtained of what is written or drawn on the product using a pen, by continually determining the position of the pen on the product by reading off the local combination of marks. This reading off can be carried out by optical detection.

Figure 1B:
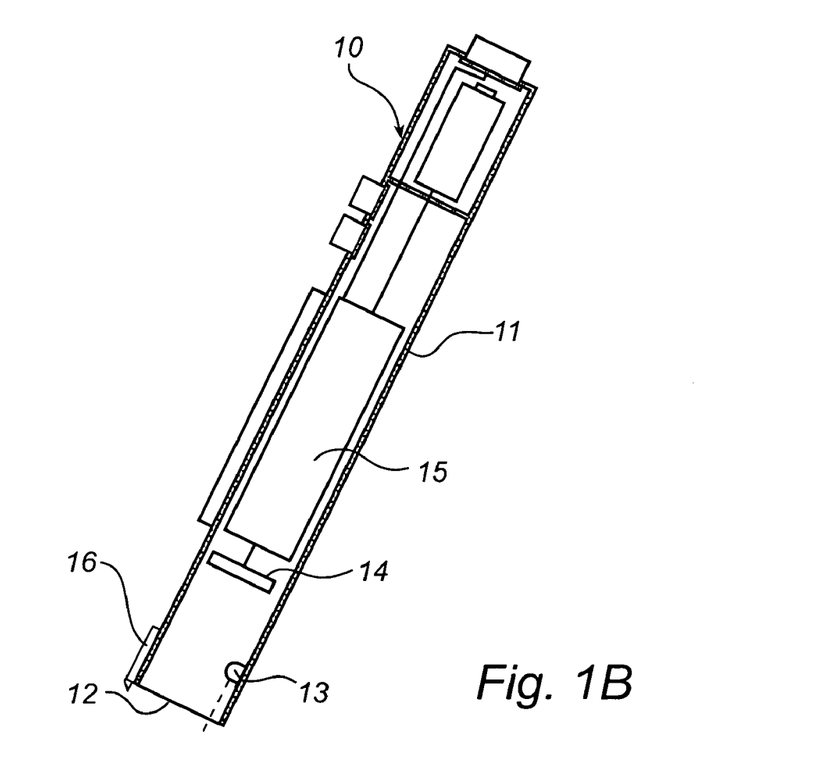
FIG. 1B shows schematically a digital pen that is used to detect the marks in FIG. 1A and to calculate a position on the basis of these.

FIG. 1B shows a hand-held apparatus 10, below called a pen, that is used for optical detection of the position-coding pattern in FIG. 1A. In the following the pen's main components will be described briefly. For a more detailed description, reference is made to the above-mentioned WO 01/16691, WO 01/26032 and WO 01/26033.

The pen 10 has a casing 11 in the shape of a pen, which has an opening 12 at one end. This end is intended to abut against or to be held a short distance from the surface on which the position determination is to be carried out.

One or more infrared light-emitting diodes 13 are arranged in the opening 12 for illuminating the surface area which is to be imaged, and an area sensor 14, sensitive to infrared light, for example a CCD or CMOS sensor, is arranged for recording a two-dimensional image of the surface area.

The area sensor 14 is connected to a data processor 15 which is arranged to determine a position on the basis of the image recorded by the sensor 14. The data processor 15 can contain one or more processors (not shown), programmed to record images from the sensor 15 or from a buffer memory (not shown) associated with the sensor, and to carry out position determination on the basis of these images.

The pen 10 has also a pen point 16 which deposits pigment ink on the product. Using this, the user can write physically on the product, while at the same time what is being written is recorded digitally via optical detection of the position-coding pattern. The pigment ink is suitably transparent to infrared light, while the marks 2 of the position-coding pattern (FIG. 1A) absorb infrared light. This means that the pigment ink does not interfere with the detection of the pattern.

Figure 2:
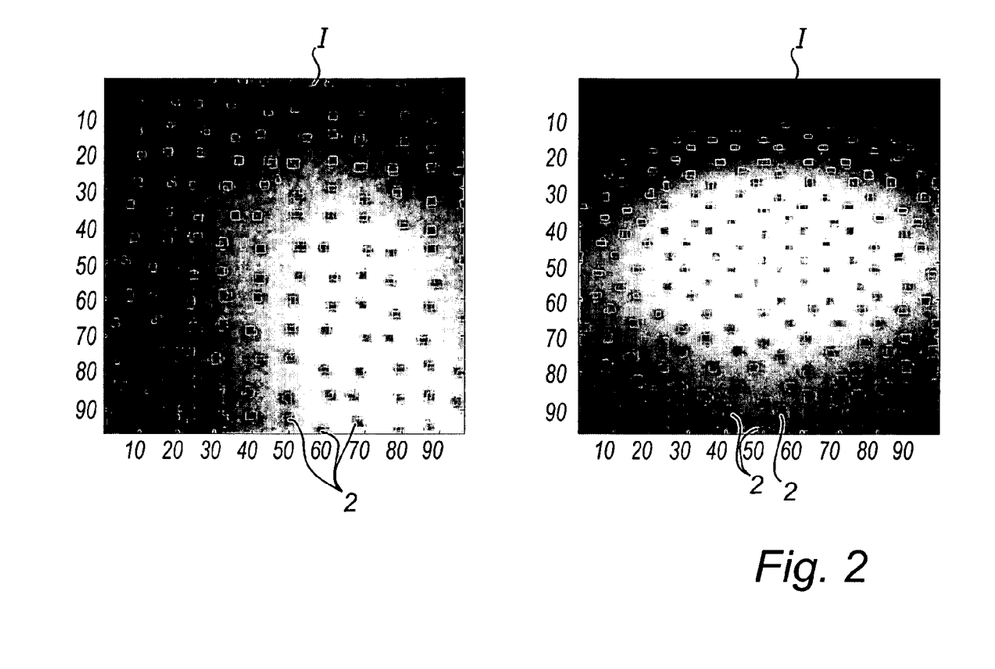
FIG. 2 shows grayscale images, recorded by the pen in FIG. 1B, of a position-coding pattern of the type shown in FIG. 1A.

When the pen 10 is passed over the position-coding pattern, the area sensor 14 thus records a sequence of digital grayscale images which are transmitted to the data processor 15 for position determination. FIG. 2 shows examples of such grayscale images I. These contain 96×96 pixels, the luminance values of which are given with 8-bit resolution. To achieve an adequate temporal resolution for the digitally recorded information, the images are read off from the area sensor 14 at a frequency of approximately 100 Hz, that is approximately 10 ms is available per image I for calculating a position.

In the images in FIG. 2, the marks 2 appear as dark dots against a bright background. Normally each mark or object covers several pixels in the image. The sharpness varies within the image as a result of the pen and thus the area sensor being angled against the base when writing down information. The contrast can also vary within the image as a result of uneven scattering properties of the base. In addition, the illumination of the base is uneven. In general, the images are well illuminated at their central parts, with, however, varying image sharpness, while the peripheral parts have low signal-to-noise ratios, due to insufficient illumination. In addition to said variations in sharpness, contrast, signal-to-noise ratio and illumination within each image, there are corresponding variations between different images, as the angle of inclination of the pen varies with time while information is being written down, and also between different users and different bases.

Figure 3:
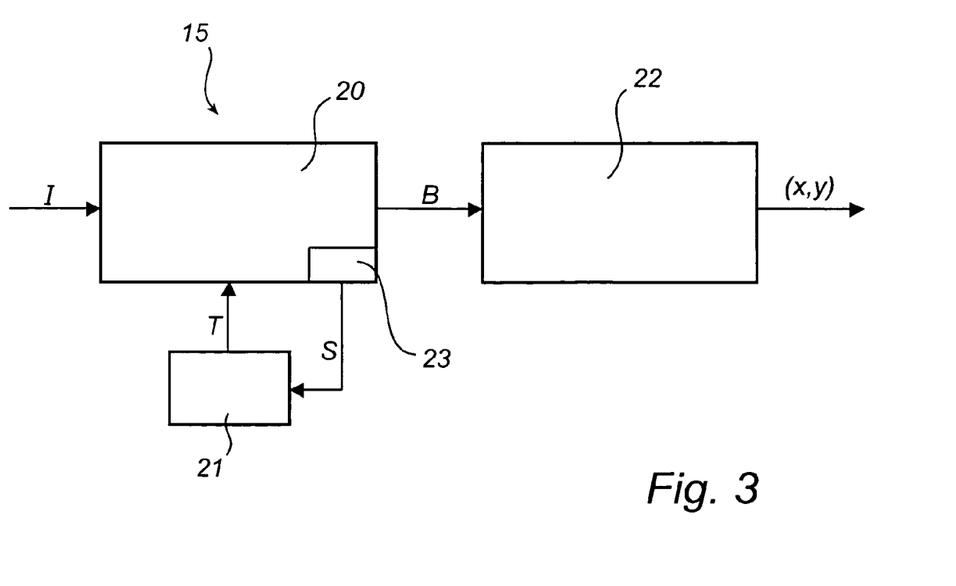

FIG. 3 shows the data processor in the pen in greater detail. The data processor 15 comprises a pre-processing unit 20, a threshold calculation unit 21 and a position determination unit 22. The pre-processing unit 20 comprises in this case a hardware circuit (ASIC) which records a current grayscale image I from the area sensor 14, obtains a threshold matrix T from the threshold calculation unit 21, and generates a binary image B. In this thresholding or binarization, the luminance value of each pixel in the current image is compared with an associated threshold value in the threshold matrix T. If the luminance value is greater than the threshold value, the corresponding luminance value in the binary image is set to one (1), otherwise to zero (0). The output binary image B thus contains dark objects (value 0) which ideally constitute the marks, against a bright background (value 1).

In the embodiment described, the pre-processing unit 20 also contains a statistics module which generates image statistical data S for given subareas or partitions in the current grayscale image I. This image statistical data S is stored in a memory 23, from which the threshold calculation unit 21 can obtain the relevant image statistical data S when it is to commence the calculation of a new threshold matrix T. The threshold calculation unit 21 thus generates the threshold matrix T based on this image statistical data S, as will be described in greater detail below.

The position determination unit 22 receives the binary image B from the pre-processing unit 20, identifies the marks in the binary image and calculates position coordinates (x,y) on the basis of the positions of the marks in relation to the virtual raster. The threshold calculation unit 21 and the position determination unit 22 consist of software which is executed in a microprocessor (not shown). The decoding in the position determination unit will not be described here in greater detail, as the present invention relates to the preliminary processing step, more particularly the binarization of the grayscale images I Embodiment 1

Figure 4A:
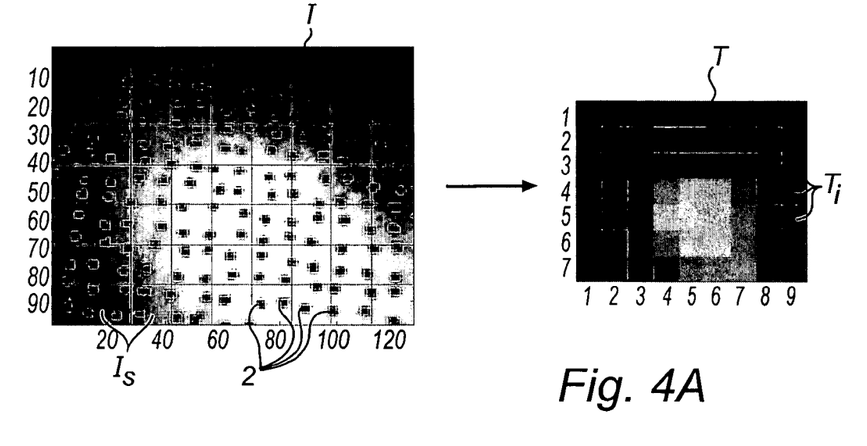

A first embodiment is based on a partitioning of grayscale images, each of which contains 96×126 pixels, into 63 (7×9) square subareas $I_s$, each of which contains 14×14 pixels, as indicated by thin lines in FIG. 4A. This division is used on the one hand by the statistics module for the generation of statistical data S, and, on the other, by the threshold calculation unit 21 for the calculation of the threshold matrix T.

The size of the subareas is set with knowledge of the images that are to be binarized. In the grayscale images the distance between the raster lines is known, in the present case approximately 7.5 pixels. On the basis of this information, the size of the subareas $I_s$ can be selected in such a way that each subarea $I_s$ with great certainty contains at least a part of a mark 2, as also shown in FIG. 4A. Since the images are taken using the hand-held apparatus 10, which is used like a pen, it must also be taken into account that the angle between the pen and the base, that is the perspective in the images, can vary depending upon the writing posture of the user.

In the present case, a raster is used with a distance between the raster lines of approximately 300 μm, together with circular dots with a displacement and a radius of approximately 50 μm. Square subareas $I_s$ with a side length of approximately 120% of the raster interval should then be sufficiently large to guarantee that each subarea $I_s$ in each image I contains at least a part of a dot. Also taking into account the varying perspective, side lengths in the range 150%–300% of the raster interval have been found to give satisfactory results. The subareas $I_s$ are thereby so large that they essentially always contain at least one dot in its entirety, which simplifies the production of an adequate threshold value for each subarea. The upper limit for the size of the subareas $I_s$ is given by the lowest acceptable resolution of the threshold matrix, which depends among other things upon the spatial size of the luminance variations in the images.

It is also possible to make the subareas $I_s$ smaller, in order to increase the resolution of the threshold matrix. In this case, certain subareas will only contain background and thus will not contain part of any mark, for which reason a correct threshold value cannot be calculated. These subareas should therefore be identified and allocated a correction value which, for example, is calculated on the basis of the threshold values for the surrounding subareas.

In the present exemplary embodiment, the statistics module derives statistical data S in the form of the greatest luminance value (max) and the least luminance value (min) within each subarea $I_s$.

In the threshold calculation unit 21 (FIG. 3), a threshold value $T_i$ is calculated for each subarea. This threshold value is stored in the threshold matrix T, as illustrated in FIG. 4A. The threshold value $T_i$ is calculated as a function of the contrast (max−min) within the subarea:

$$T_i = \text{max} - k_i \cdot (\text{max} - \text{min}).$$

The greatest value (max) within the subarea is assumed to give an adequate indication of the background luminance within the subarea, and the least value within the subarea is assumed to give an adequate indication of the object luminance of the mark or marks within the subarea. It has been found that each subarea should advantageously contain at least one mark in its entirety, so that the actual luminance depth of the mark can be used in the calculation of the threshold value.

The factor $k_i$ determines at which contrast depth the threshold value is to be set. In order to reduce the effect of noise and lack of sharpness, the contrast depth factor $k_i$ is set on the basis of a classification of each subarea into the classes "sharp", "lacking in contrast" and "noisy".

Each subarea that has a greatest luminance value (max) below a noise limit value is classified as "noisy". According to one embodiment, the noise limit value is defined as the mean value of the greatest luminance values in all the subareas, which can be calculated in a simple way from said image statistical data S.

Other subareas are classified as either sharp or lacking in contrast, depending upon whether the contrast in the image is above or below a contrast limit value. According to one embodiment, the contrast limit value is defined as the mean value of the contrast in all the subareas in the current image, which can also be calculated in a simple way from said image statistical data S.

Figure 5A:
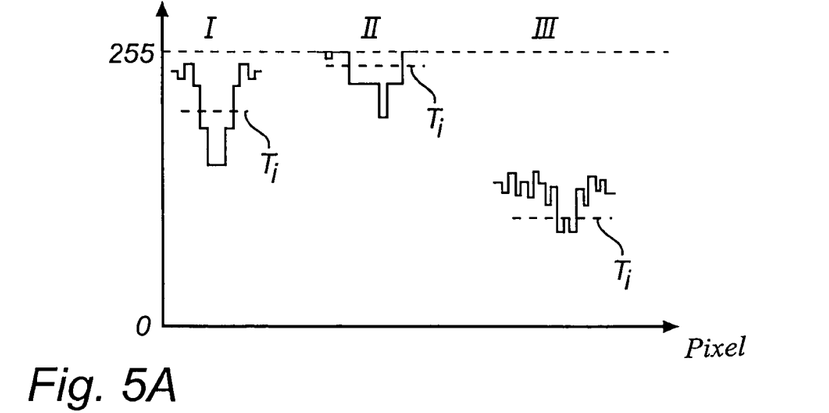
FIG. 5A illustrates schematically the classification of objects in the image.

FIG. 5a shows examples of the classification of the subareas in a diagram of the luminance as a function of pixels. The subarea I is "sharp", the subarea II "lacking in contrast" and the subarea III is "noisy". In FIG. 5A the threshold values $T_i$ for the respective subareas are also indicated by broken lines. It has been found advantageous to set the factor $k_i$ to a value in the range 0.6–0.8 in noisy subareas, 0.3–0.5 in subareas lacking in contrast and 0.4–0.6 in sharp subareas. According to one embodiment, the central value in each of the above ranges is used.

Thus the threshold value is set relatively far from the background luminance (max) in noisy subareas, which are typically to be found at the periphery of the image. This reduces the risk of the threshold value being set at the level of the background noise, which could result in the thresholding generating a binary image with many small fictitious structures. In order to reduce still further the number of fictitious structures, the noisy subareas can undergo a supplementary contrast control, for example by the threshold value being set to zero in the noisy subareas that have a contrast similar to typical noise levels.

In subareas lacking in contrast, that is subareas with high signal-to-noise ratio and low contrast, however, the threshold value is set relatively close to the background luminance (max). This increases the probability of associated marks being identified as structures with a plurality of connected pixels, which in turn provides a better estimation of the position of the mark in the subsequent decoding in the position determination unit 22. In many cases, this type of subarea is in fact overexposed, for which reason the luminance depth of the marks is only given by one or a few pixels, as indicated in FIG. 5A.

After the above calculation, the threshold matrix T contains a threshold value $T_i$ per subarea $I_s$ (cf. FIG. 4A).

Of course, the classification of the subareas can be made more sophisticated. For example, histograms or standard deviations can be used to identify noise, mean values can be used to identify background luminance, etc. An advantage of the use of the minimum and the maximum for each subarea is, however, that these values can be extracted from a grayscale image in a calculation-effective way. In addition, the number of calculation steps is minimized in the production of the threshold matrix.

Figure 5B:
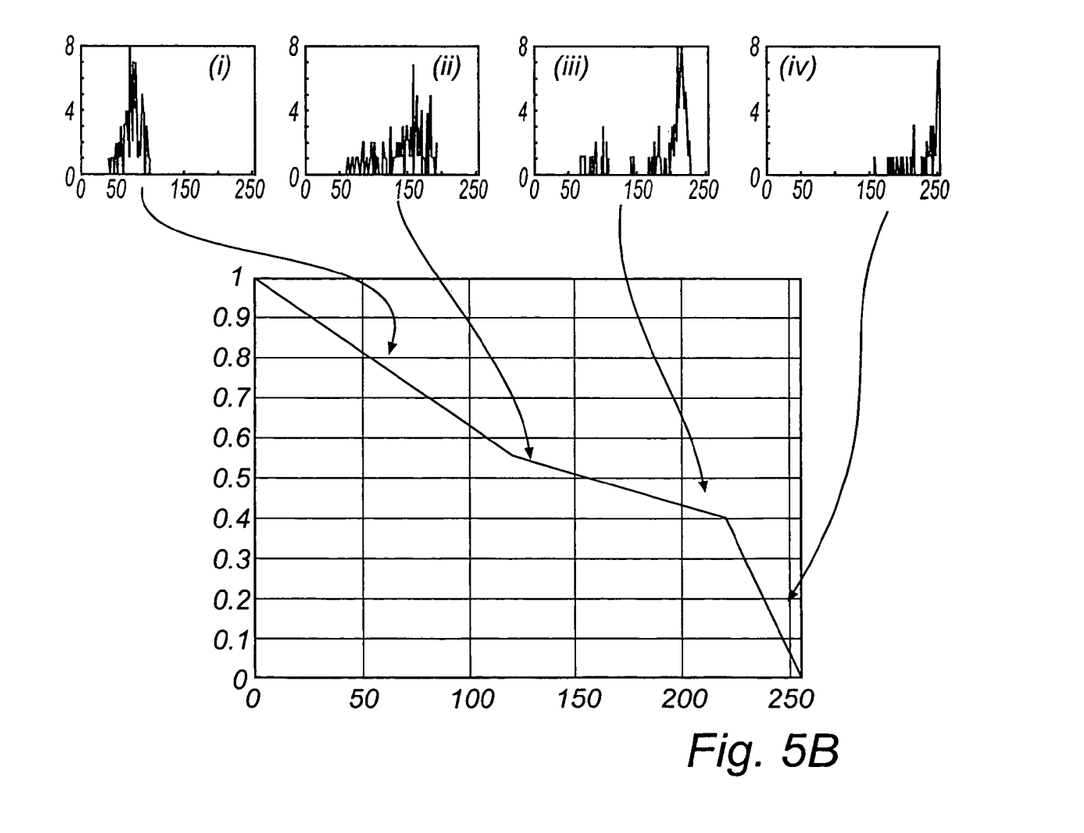
FIG. 5B illustrates schematically a generalization of the embodiment in FIG. 5A.

According to a further variant, the mean value of the luminance values of the pixels is calculated within the respective subarea, after which the threshold value is calculated on the basis of this mean value and of the contrast in the subarea in question, in accordance with:

$$T_i = \text{max} - f(m_i) \cdot (\text{max} - \text{min}),$$

where f(m) is a function of the luminance mean value $m_i$ in the subarea in question and has a value in the range 0–1. FIG. 5B shows an example of the appearance of the function f(m). Unlike the factor $k_i$ described above, which varies in steps depending upon the classification of the subarea, f(m) is a continuous and monotonically decreasing function of the luminance mean value of the subarea. Low luminance mean values give both low contrast and low signal-to-noise ratio, as indicated by the luminance histogram (i), for which reason the value of the function is set close to 1 (corresponding to the above class "noisy"). With increasing luminance mean values, the signal-to-noise ratio and the contrast tend to increase gradually, as indicated by the luminance histograms (ii) and (iii), for which reason the value of the function is allowed to decrease to a corresponding extent. Finally, f(m) becomes approximately 0.5 (corresponding to the above class "sharp"). With sufficiently high luminance mean values, the contrast is again reduced (see the luminance histogram (iv)) as a result of overexposure of the subarea (corresponding to the above class "lacking in contrast"). In order to maximize the probability that the mark or marks that are included in the subarea are actually identified by the thresholding, the function f(m) is here set to a value close to 0, that is the threshold value becomes close to the estimated background luminance.

Those skilled in the art will recognize that the function in FIG. 5B can be modified. For example, it can consist of more segments (classes), with other breakpoints and inclinations. Alternatively, the function can be a curve, as given by a second degree equation or the like.

It should also be pointed out that the above function can depend on other variables than the luminance mean value, for example the median value, the sum, the greatest or the smallest of all the luminance values within the subarea.

Embodiment 2

In the first embodiment, the same subareas are used for estimating both background luminance and object luminance in the grayscale image. In the following exemplifying embodiment, subareas of different sizes are instead used for estimating the background luminance and object luminance of the grayscale image.

In this example, the threshold matrix is thus calculated based on image statistical data for two different sets of subareas, object subareas and background subareas. The object subareas and the background subareas overlap each other and cover all that part of the image that is to be binarized. The object subareas correspond in size to the subareas that are used in the first embodiment, that is they are so large that they contain with certainty at least a part of a mark. The background subareas can, however, be made smaller, as they only need to be large enough to contain with certainty pixels that are representative of the image's local background luminance, that is they should be larger than each mark in the image. Any enlargement as a result of the effects of perspective should be taken into account.

Figure 4B:
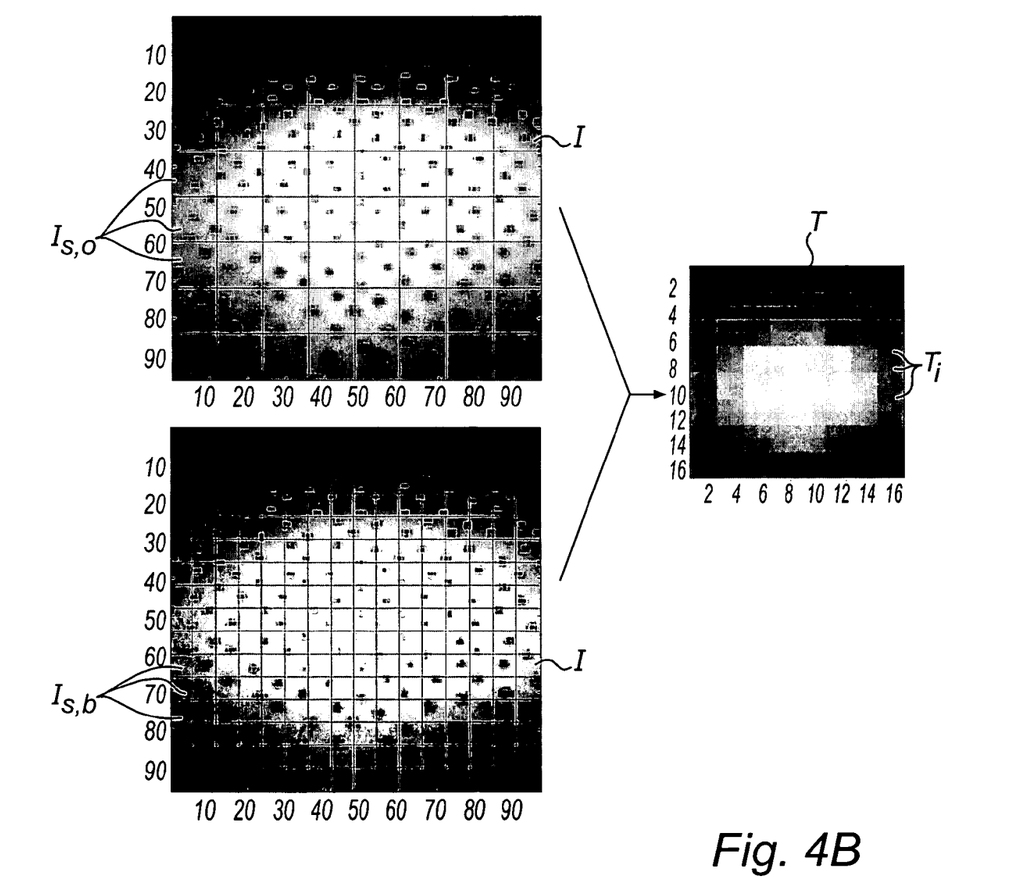

FIG. 4B shows an example of the partitioning into object subareas and background subareas. This partitioning is suited to the same coding pattern as the first embodiment, however for grayscale images consisting of 96×96 pixels. Each grayscale image is divided into 64 (8×8) object subareas $I_{s,o}$ each of which contains 12×12 pixels, and into 256 (16×16) background subareas $I_{s,b}$, each of which contains 6×6 pixels. In this example, the object subareas $I_{s,o}$ are dimensioned to comprise a whole number of background subareas $I_{s,b}$ (in this case four), whereby the calculation of the threshold matrix is simplified.

As in the first embodiment, a threshold value can now be calculated for each background subarea, in accordance with:

$$T_i = b_i - k_i * (b_i - o_i),$$

where $b_i$ is the estimation of the background luminance within the background subarea $I_{s,b}$, and $o_i$ is the estimation of the object luminance within the larger object subarea $I_{s,o}$ which overlaps the current background subarea $I_{s,b}$. As in the first example, the background luminance is estimated as the greatest luminance value within the background subarea and the object luminance as the least luminance value within the object subarea. Of course, the threshold value can be calculated in alternative ways, as described in connection with the first embodiment above.

In practice, the threshold matrix is calculated based on a background matrix, which contains the background luminances estimated for the background subareas $I_{s,b}$, and an object matrix which contains the object luminances estimated for the object subareas $I_{s,o}$. In general, it is preferable that the object subareas $I_{s,o}$ overlap a whole number of background subareas $I_{s,b}$, as the data that requires intermediate storage in the background matrix and the object matrix is thereby minimized.

It should be pointed out that the statistics module in the pre-processing unit 20 (FIG. 3) can be designed to generate separate image statistical data for the background subareas $I_{s,b}$ and the object subareas $I_{s,o}$. In certain cases, however, the image statistical data for the object areas $I_{s,o}$ can be calculated from the image statistical data for the background subareas $I_{s,b}$. For instance, this is the case in the example above, with estimation based on minimum and maximum values and with adjustment of the relative sizes of the background subareas and the object subareas.

Both embodiments described above result in a threshold matrix T containing a threshold value $T_i$ per subarea $I_s$ and $I_{s,b}$, respectively. It has, however, been found that the precision of the thresholding is improved if the threshold matrix is given additional threshold values by interpolation, between the threshold values calculated as defined above. Such additional threshold values can be created by linear interpolation of adjacent values in the threshold matrix. The linear interpolation is carried out in two steps, interpolation by rows and interpolation by columns. The threshold matrix interpolated in this way can then, if required, undergo a further interpolation. It should be noted that the relationship between the threshold values and the subareas is changed when the threshold matrix is given additional threshold values by means of interpolation. From having been applicable to all pixels within a subarea, each threshold value is now applicable to pixels within smaller thresholding areas of each image. Each first calculated threshold value is suitably allocated to a thresholding area in the center of its subarea, whereupon the new threshold values can be allocated to thresholding areas in between. By one or two interpolations, each such thresholding area has a size that is ¼ or ¹⁄₁₆, respectively, of the size of the subarea.

An alternative method for improving the precision of the thresholding, is to have the threshold matrix calculated in accordance with the embodiment above undergo a low-pass filtering, for example by convolution of the threshold matrix with a suitable 3×3 matrix.

Figure 6:
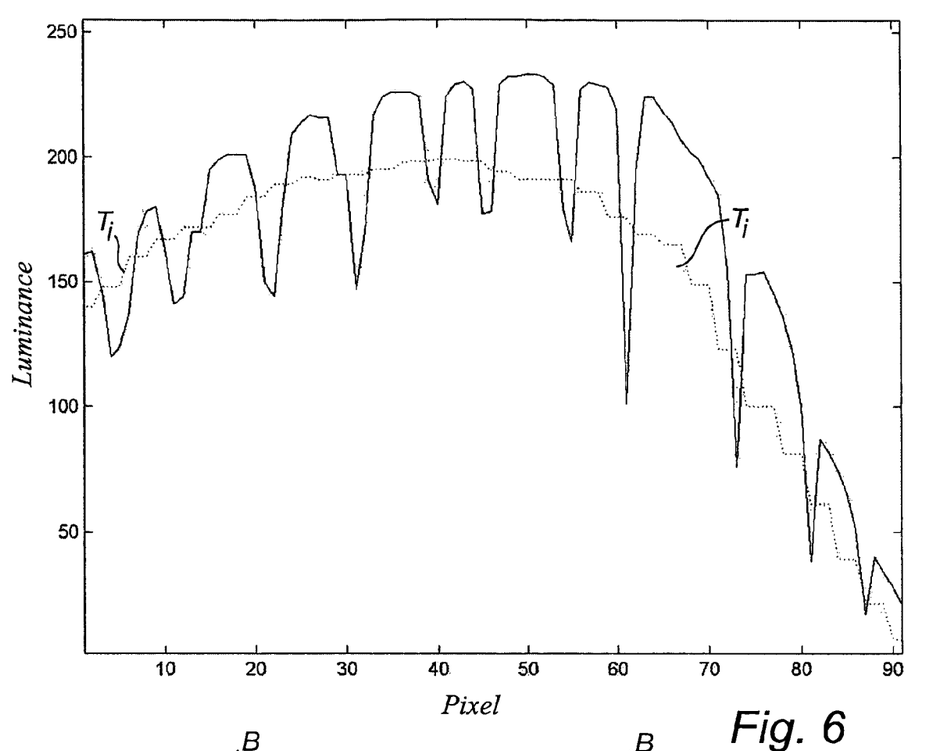
FIG. 6 shows luminance values along a line in a grayscale image, in which associated threshold values in the threshold matrix are indicated by broken lines.

FIG. 6 shows the luminance distribution along a line in a grayscale image, together with calculated threshold values $T_i$ along this line. The threshold values in FIG. 6 are produced according to the second embodiment with a subsequent enlargement of the threshold matrix by linear interpolation. In spite of large variations in background luminance, signal-to-noise ratio and contrast, the calculated threshold values $T_i$ accord well with the luminance values along the line.

Figure 7:
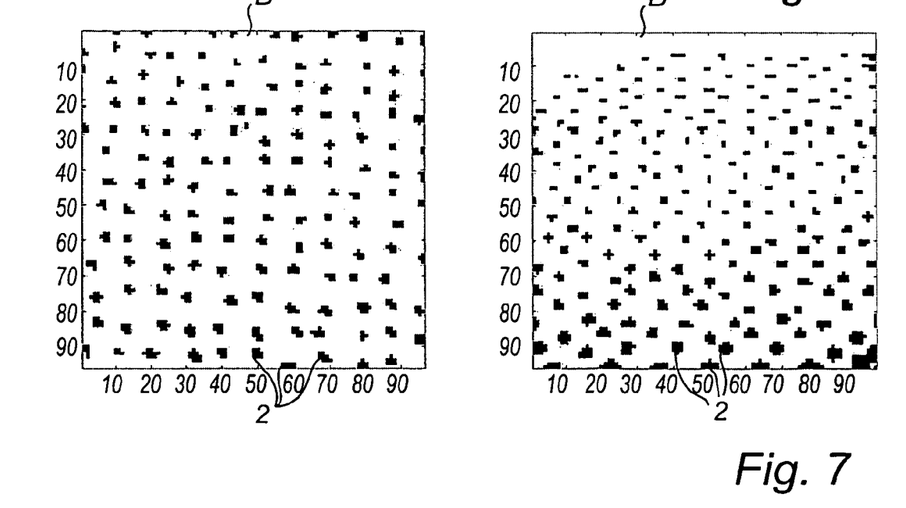
FIG. 7 shows the grayscale images in FIG. 2 after the thresholding thereof according to the invention.

FIG. 7 shows a number of binary images B that have been generated by the thresholding of the grayscale images shown in FIG. 2. The thresholding is carried out according to the second embodiment with a subsequent enlargement of the threshold matrix by linear interpolation. A comparison of FIGS. 2 and 7 shows that the thresholding results in a satisfactory identification of the marks 2, even with variations in illumination, base properties and imaging conditions within the grayscale images.

A threshold matrix can obviously be calculated for one particular grayscale image and then used for the thresholding of the same with high precision. The calculation of the threshold matrix can be carried out quickly, based on given image statistical data. It is estimated that it takes approximately 8000 clock cycles for the calculation of the threshold matrix according to the second embodiment, that is with a background matrix estimated for 16×16 subareas, an object matrix estimated for 8×8 subareas and a mean value matrix estimated for 8×8 subareas. For an 80 MHz processor, this corresponds to a calculation time of 100 μs.

Now returning to FIG. 3, it has been found that the algorithms described above can permit a further increase of the throughput of images I through the data processor 15, by carrying out the calculation of the threshold matrix in parallel with the actual thresholding. The threshold matrix is thus calculated on the basis of a preceding image, which is similar to the subsequent image or images to be thresholded by use of this calculated threshold matrix. This can be regarded as if the threshold matrix is periodically updated and then used in thresholding one or more subsequent images. It has been found fully possible to use one and the same threshold matrix for the thresholding of a plurality of, for example 5–10, consecutive grayscale images.

According to this embodiment, a given grayscale image can be thresholded at the same time as it is being read in from the sensor by the data processor 15. This thresholding can thus be implemented in hardware and in this way relieve the processor (not shown) which carries out the calculations in the threshold calculation unit 21 and the position determination unit 22. This hardware can at the same time also generate the above-mentioned image statistical data S in order to relieve the processor still further. In addition, the need for intermediate storage of the grayscale image is avoided as this can be processed by direct comparison with an already-calculated threshold matrix.

This embodiment is made possible by the fact that the algorithms according to the invention have a sufficient tolerance to variations in luminance and/or sharpness from image to image. Among other things, this is because the threshold matrix T is calculated on the basis of image statistical data for given subareas in the grayscale images and thereby contains threshold values that are related to the overall luminance distribution in the images, both with regard to the background and to the object. This can be regarded as if the threshold matrix contains both global information which is relevant for several consecutive images, and local information, which allows for the thresholding of each object in relation to its local surroundings. As each subarea, which contains a plurality of pixels, is allocated a threshold value in the threshold matrix, the effect of local variations is limited. In other words, the size of the subareas is selected in such a way that the calculated threshold value is sufficiently insensitive to local variations in order to achieve a desired tolerance to variations in luminance and/or sharpness from image to image.

According to an alternative embodiment of the data processor 15 in FIG. 3, the preprocessing unit 20 is designed to buffer, before, after or during the generation of said image statistical data S, one or more associated grayscale images, for instance in the memory 23. The threshold matrix T which is calculated by the threshold calculation unit 21 for a current grayscale image can thus be used by the preprocessing unit 21 for binarization of the same current image, and optionally a subsequent image in the incoming sequence of images.

It should be pointed out that the above description is only intended to provide an example of how the invention can be realized within the scope of the protection that is defined by the appended claims.

For example, before the binary images are analyzed further for position determination, they can undergo an area check, with the aim of eliminating fictitious marks on the basis of the number of connected pixels within each mark. Accordingly, marks consisting of one or a few pixels can be assumed to originate from noise and can therefore be removed. As the maximal size of the marks is known, an upper area threshold can also be set.

The above-mentioned contrast depth factor can, instead of being set at a predetermined value or be calculated on the basis of the classification of associated subareas, be given by an external process, such as a control loop. Such an embodiment is described in Applicant's Swedish Patent Application SE 0103845-4 filed on 20 Nov. 2001.

According to a further alternative, the calculation of image statistical data can be carried out in the threshold calculation unit instead of in the pre-processing unit.

It should also be pointed out that, as an alternative to the described combination of hardware circuits and software-controlled processor, the data processor can be realized completely in hardware or completely in software.

In addition, it should be emphasized that the subareas can be of any shape, such as square, rectangular, triangular, rhombic, hexagonal, etc.

The invention is in no way restricted to the described position-coding pattern, but can also be used for the identification and decoding of other position-coding patterns. It should also be pointed out that the raster described above can have other shapes than orthogonal, such as a rhombic grid, for example with 60 degree angles, a triangular or hexagonal grid, etc. In addition, the marks can be displaced in other directions than along the raster lines.

In the exemplary embodiment above, the pattern is optically readable and the sensor is thus optical. It is recognized, however, that the images that are processed according to the invention can be generated in another way, for example by detection of chemical, acoustic, electromagnetic, capacitive or inductive parameters. Similarly, it is recognized that the invention can also be used for identification of bright marks against a dark background.

Finally, it should be noted that the invention can be used in general for identification of individual objects in a digital image in a quick and memory-efficient way, particularly when there are variations in luminance and/or sharpness within an image.

What I claim and desire to secure by Letters Patent is:

1. A method for identifying individual objects in a digital image that is constructed of pixels with a respective luminance value, comprising estimating, based on a first and a second division of a reference image which corresponds to the digital image into a plurality of first and second subareas, a background luminance value for each first subarea and an object luminance value for each second subarea wherein said objects are positioned relative to an invisible raster of known dimensions, the second subareas being dimensioned with regard to the known dimensions of the raster;

calculating, for each overlapping first and second subarea, a threshold value based on the associated background and object luminance values;

creating a threshold matrix from said threshold values; and comparing the luminance values of the digital image with the threshold values of the threshold matrix in order to create a binary image on the basis of the comparison.

2. A method according to claim 1, in which the reference image is divided so that the first subareas are mutually exclusive and the second subareas are mutually exclusive.

3. A method according to claim 1, comprising estimating the background luminance value on the basis of first order statistics of the luminance values of the pixels within the first subarea.

4. A method according to claim 3, comprising estimating the background luminance value on the basis of the greatest luminance value of the pixels within the first subarea.

5. A method according to claim 1, comprising estimating the object luminance value on the basis of first order statistics of the luminance values of the pixels within the second subarea.

6. A method according to claim 5, comprising estimating the object luminance value on the basis of the least luminance value of the pixels within the second subarea.

7. A method according to claim 1, comprising designing the subareas so that each second subarea at least partly comprises a first subarea.

8. A method according to claim 7, comprising designing the subareas so that each second subarea comprises a whole number of the first subareas.

9. A method according to claim 1, comprising designing the subareas so that the first and second subareas coincide.

10. A method according to claim 1, comprising designing the second subareas in such a way that each one contains at least a part of at least one of said objects.

11. A method according to claim 1, comprising designing the second subareas in such a way that each one contains at least one object in its entirety.

12. A method according to claim 1, comprising designing the first subareas in such a way that they are larger than said objects.

13. A method according to claim 1, comprising:
classifying the subareas into at least a first category with a high signal-to-noise ratio and a second category with a low signal-to-noise ratio; and
setting the threshold value at a greater relative distance from the background luminance value in subareas belonging to the second category than in subareas belonging to the first category.

14. A method according to claim 13, comprising:
further classifying the subareas into a third category with a high signal-to-noise ratio and a low contrast; and
setting the threshold value at a smaller relative distance from the background luminance value in subareas belonging to the third category than in subareas belonging to the first category.

15. A method according to claim 1, comprising a subsequent smoothing in which the respective calculated threshold values of the threshold matrix are updated on the basis of adjacent calculated threshold values in said threshold matrix.

16. A method according to claim 15, in which during the subsequent smoothing the threshold matrix is provided with additional threshold values, by interpolation of adjacent calculated threshold values in the threshold matrix.

17. A method according to claim 15, in which the subsequent smoothing comprises a low-pass filtering of the threshold matrix.

18. A method according to claim 1, in which the reference image consists of the digital image.

19. A method according to any claim 1, in which the digital image is part of a sequence of digital images, and in which the reference image consists of an image in the sequence of digital images.

20. A method according to claim 19, in which the threshold matrix is calculated intermittently on the basis of the luminance values of a current image in the sequence of digital images and is used for the binary conversion of a subsequent image in the sequence of digital images.

21. A computer-readable medium comprising a computer program with instructions for causing the computer to implement a method according to claim 1.

22. A hardware circuit, such as an ASIC, that is designed to implement a method according to claim 1.

23. A device for identification of individual objects in a digital image consisting of pixels with a respective luminance value, comprising:
a thresholding unit which is designed to receive the digital image and compare the luminance values of the digital image with the threshold values of a threshold matrix in order to create a binary image on the basis of the comparison; and
a threshold calculation unit which is designed to estimate, on the basis of a first and a second division of a reference image which corresponds to the digital image into first and second subareas respectively, a background luminance value for each first subarea and an object luminance value for each second subarea, to calculate a threshold value for each overlapping first and second subarea on the basis of the associated background and object luminance values and to create the threshold matrix from said threshold values, wherein said objects are positioned relative to an invisible raster of known dimensions, and in which the second subareas are dimensioned with regard to the known dimensions of the raster.

24. A device according to claim 23, in which the threshold calculation unit is designed to divide the reference image so that the first subareas are mutually exclusive and the second subareas are mutually exclusive.

25. A device according to claim 23, in which the threshold calculation unit is designed to estimate the background luminance value on the basis of first order statistics of the luminance values of the pixels within the first subarea.

26. A device according to claim 23, in which the threshold calculation unit is designed to estimate the object luminance value on the basis of first order statistics of the luminance values of the pixels within the second subarea.

27. A device according to claim 23, in which each second subarea at least partly comprises a first subarea.

28. A device according to claim 27, in which each second subarea comprises a whole number of the first subareas.

29. A device according to claim 23, in which the first and the second subareas coincide.

30. A device according to claim 23, in which each second subarea contains at least a part of at least one of said objects.

31. A device according to claim 23, in which each second subarea contains at least one object in its entirety.

32. A device according to claim 23, in which each first subarea is larger than said objects.

33. A device according to claim 23, in which the threshold calculation unit is arranged to use the digital image as reference image.

34. A device according to claim 23, in which the digital image is included in a sequence of digital images, the threshold calculation unit being arranged to use an image in the sequence of digital images as reference image.

35. A device according to claim 34, in which the thresholding unit is designed to calculate image statistical data related to said subareas in the digital image in connection with the receipt of the digital image, and compare, to create the binary image, in connection with the receipt of the digital image, the luminance values of the digital image with the threshold values of a previously calculated threshold matrix.

36. A device according to claim 35, in which the threshold calculation unit is designed to intermittently read said image statistical data and on the basis thereof calculate said threshold matrix.

37. A device according to claim 34, in which the thresholding unit is designed to calculate image statistical data related to said subareas in the digital image in connection with the receipt of the digital image, receive from the threshold calculation unit a threshold matrix calculated on the basis of said image statistical data, and compare the luminance values of the digital image with the threshold values of the received threshold matrix to create the binary image.

38. A device according to claim 37, in which the threshold calculation unit is designed to intermittently read said image statistical data and on the basis thereof calculate said threshold matrix.

39. A device according to claim 23, further comprising:
a hardware circuit for realization of the thresholding unit; and
a processor unit with executable software for realization of the threshold calculation unit.

40. A hand-held apparatus for position determination, comprising
a sensor for production of a sequence of images of a surface with a position-coding pattern; and
a processing unit which is arranged to receive an image in said sequence and, calculate a position based on the position-coding pattern in the image, the processing unit comprising a device according to claim 23.

41. A hand-held apparatus for position determination, comprising:
a sensor for production of a sequence of images of a surface with a position-coding pattern; and
a processing unit which is arranged to receive an image in said sequence and, calculate a position based on the position-coding pattern in the image, the processing unit further comprising
a thresholding unit which is designed to receive the digital image and compare the luminance values of the digital image with the threshold values of a threshold matrix in order to create a binary image on the basis of the comparison, and
a threshold calculation unit which is designed to estimate, on the basis of a first and a second division of a reference image which corresponds to the digital image into first and second subareas respectively, a background luminance value for each first subarea and an object luminance value for each second subarea, to calculate a threshold value for each overlapping first and second subarea on the basis of the associated background and object luminance values and to create the threshold matrix from said threshold values.

* * * * *